(12) United States Patent
Foote (10) Patent No.: US 8,656,865 B1
(45) Date of Patent: Feb. 25, 2014

(54) ANIMAL CARE METHOD (76) Inventor: Sally Jeanne Foote, Tuscola, IL (US)

( * ) Notice: Subject to any disclaimer, the term of this patent is extended or adjusted under 35 U.S.C. 154(b) by 331 days.

(21) Appl. No.: 13/068,432

(22) Filed: May 11, 2011

Related U.S. Application Data

(60) Provisional application No. 61/400,186, filed on Jul. 23, 2010.

(51) Int. Cl.
*A01K 15/02* (2006.01)

(52) U.S. Cl.
USPC .................................. 119/712; 119/908

(58) Field of Classification Search
USPC .......... 119/712, 719, 720, 721, 908; 340/573.1, 573.2, 573.3, 573.4
See application file for complete search history.

(56) References Cited

U.S. PATENT DOCUMENTS

| | | | | |
|---|---|---|---|---|
| 4,182,272 A * | 1/1980 | Taff | ............ | 119/795 |
| 4,414,921 A * | 11/1983 | Cozzi | ............ | 119/719 |
| 4,480,589 A * | 11/1984 | Schneider | ............ | 119/865 |
| 4,785,433 A * | 11/1988 | Bush et al. | ............ | 368/109 |
| 5,435,271 A * | 7/1995 | Touchton et al. | ............ | 119/721 |
| 6,705,516 B1 * | 3/2004 | Kubota | ............ | 235/375 |
| 6,748,898 B2 * | 6/2004 | Ulman et al. | ............ | 119/57.92 |
| 6,904,868 B2 * | 6/2005 | Block et al. | ............ | 119/51.12 |
| 7,263,953 B2 * | 9/2007 | Sundararajan | ............ | 119/719 |
| 7,328,671 B2 * | 2/2008 | Kates | ............ | 119/720 |
| 7,861,676 B2 * | 1/2011 | Kates | ............ | 119/720 |
| 7,886,648 B2 * | 2/2011 | Williams et al. | ............ | 89/1.11 |
| 7,966,971 B2 * | 6/2011 | Zimmerman | ............ | 119/51.02 |
| 8,087,335 B2 * | 1/2012 | Shekarri | ............ | 89/1.11 |
| 8,132,538 B1 * | 3/2012 | Schick et al. | ............ | 119/502 |
| 8,282,557 B2 * | 10/2012 | Haynes et al. | ............ | 600/443 |

* cited by examiner

*Primary Examiner* — Yvonne Abbott
(74) *Attorney, Agent, or Firm* — Singleton Law Firm, P.C.

(57) ABSTRACT

Animal care methods for improving animal and animal handler safety in animal care situations by scoring and documentation are provided.

15 Claims, 8 Drawing Sheets

300 — Name of Pet: [____] DOB: [____] — 10
305 — Name of Owner: [____] — 310
Treat Preference ( rate from + to ++++)
Chewie [____]    Liverpaste [____]
HA Treat [____]    Peanut butter [____]
Lamb/Rice roll [____]    Cat treats [____] — 320
Verbal Praise [____]    Physical praise [____]
315 — Exam preference ( rate from + to -) — 10
Floor [____]  Table [____]  Carrier [____]  Muzzle [____]
Feliway [____]  DAP [____]  Hood [____]  Held in arms [____]
Towel/blanket [____]    Prey play [____]

| Treat Preference ( rate from + to ++++) | |
|---|---|
| Chewie | Liverpaste |
| HA Treat | Peanut butter |
| Lamb/Rice roll | Cat treats |
| Verbal Praise | Physical praise +++ (Chin Rubbing) |
| Exam preference ( rate from + to -) | | | |

| Floor | Table + | Carrier | Muzzle |
| Feliway | DAP | Hood | Held in arms |
| Towel/blanket + | Prey play | | |

FIG. 8

ANIMAL CARE METHOD

CROSS-REFERENCE TO RELATED APPLICATIONS

This application claims the benefit of Provisional Patent Application Ser. No. 61/400,186, filed Jul. 23, 2010 by the present inventor.

FEDERALLY SPONSORED RESEARCH

Not applicable

BACKGROUND OF THE INVENTION

This invention relates to a method for providing animal care and facilitating the safety of animals and animal handlers.

Domesticated animals, animals under scientific study, or animals in zoos are often in stressful situations including veterinary exams, grooming or loading for transport that may cause a fear response due to associations of pain, stress or anxiety with these events. Early socialization and desensitization with rewards and positive reinforcers helps animals experience these situations in a positive way, resulting in calm behavior. This calm behavior and compliance assists the performance of important actions prior to and during treatment and handling such as loading the animal onto a trailer or table and encouraging the animal to stand still for exam. This compliance is important because it prevents possible injury to the animal and its handlers. Many animals will comply with an otherwise stressful situation if they know that they will be rewarded.

When an animal has not been socialized or desensitized to certain care and handling procedures, there is often an associated fear response in the animal due to the pain, overstimulation and unpredictability of the situation. The fear response can cause the animal to react in a fight or flight manner exhibited by kicking, biting, scratching or jumping. These behaviors risk injury to the animal as well as the handler. Use of force to handle the animal often will escalate their fear and response, increasing the likelihood of injury. Behaviorists recommend desensitizing animals to stressful situations such as veterinary exams or transport. Using positive reinforcement for care decreases the reactivity of the animal. For example, the assistant can give a tasty treat to the animal, waiting until they are calm before the veterinarian gives an injection. A desensitized animal will continue to consume the treat, or be distracted during the injection, rather than flinching and turning their head in an attempted or actual bite.

Care handlers and animal owners have used rewards and positive reinforcers to help desensitize animals to these situations which often trains the animal to behave calmly during exams, care, and handling. Consistently providing the animal with customized positive reinforces that are known to be effective helps to ensure that they are more reliably calm during exams, care and handling. For example, when the same treat (positive reinforcer) is used in the same way each time the animal is loaded into their carrier, the animal is calm due to the predictability of the handling, setting and treat. These animals are less likely to react in ways that may cause themselves or handlers excess harm.

In addition to providing the animal with a form of treat, veterinary care professionals and animal owners also use certain environmental mechanisms and tools to desensitize and calm an animal during a stressful procedure. Certain animals might not like to be lifted onto a table and would prefer to be treated on the ground or in the arms of a technician. Other animals might respond more positively to being covered in or supported by a towel or blanket. Additionally, certain chemicals that serve as the synthetic analogs to appeasing animal pheromones, such as DAP for dogs and Feliway for cats, can be used to calm and comfort the animal.

DAP is the synthetic analog of the appeasing pheromone that the mother dog produces to calm her puppies so that they will nurse. Adult dogs still have the receptors for the DAP in their brain. DAP in the air, or in contact with objects around a dog, helps calm the dog. It decreases fear moderately to greatly depending on how sensitive the dog is to DAP, and how escalated the dog is when DAP is used.

Feliway is the synthetic analog of the facial pheromones of the cat. When Feliway is sprayed on surfaces, the cat feels like it has marked those areas and accepted them. This helps the car to feel less anxious about the space that they are in.

Animals often will visit various care givers in the same care situation, such as exams by different veterinarians or grooming by different groomers whereby the animal will be exposed to similar stresses. In each situation, different rewards or no rewards at all might be offered for an exam, resulting in an unpredictable experience for the animal. Problems arise when inconsistent positive reinforcement is given to the animal in various care situations. An offered treat may be rewarding, but not as predictable and this can increase or fail to reduce anxiety in the animal. This is opposed to a situation where each caregiver has a means of knowing how to predictably calm and offer customized positive reinforcement to the animal, thereby triggering an innate calming response. Currently there is no system or method of documenting customized reinforcers used to desensitize individual animals for their care.

Objects and Advantages

It is an object of the invention to provide a method for recording and recalling the effectiveness of positive reinforcers on animal behavior during animal care or handling situations. The method allows consistent handling of animals and decreases reactivity to ensure safer care for themselves and the humans around them.

Further objects and advantages will become apparent from a consideration of the drawings and ensuing description.

SUMMARY OF THE INVENTION

A method for improving the safety of an animal and an animal handler in an animal care or handling situation is provided. The animal exhibits a behavior in response to the animal care or handling situation. Reinforcers are administered to the animal, so that the animal's behavior is safer for the care of the animal and/or the safety of the animal handler. The individual animal and the specific animal care or handling situation are associated with a customizable record. If information about the effect of various unique reinforcers on the behavior of the animal is already present on the record, the information is read to find the reinforcer that is most effective in encouraging safe behavior in the animal for the particular animal care or handling situation. That reinforcer is then administered to the animal prior to or during the process of providing the animal care or handling relevant to the situation. If such information is not present, the animal is administered each reinforcer to gauge its effectiveness at encouraging safe behavior in the animal for the particular situation.

Information about the effect of each reinforcer on the behavior of the animal is added to the record.

DETAILED DESCRIPTION OF THE INVENTION

In the following description, for purposes of explanation, rather than limitation, specific details are set forth such as the form of the record, the treat administered, the examination preference, etc., in order to provide a thorough understanding of the claimed invention.

For purposes of this Detailed Description, the term "record" is meant to apply generally, to include all means of storing specified fields of information associated with, for example, the characteristics of the animal, possible reinforcers to try in each care or handling situation, rating information as to the effectiveness of each reinforcer, etc.

Figure 1:
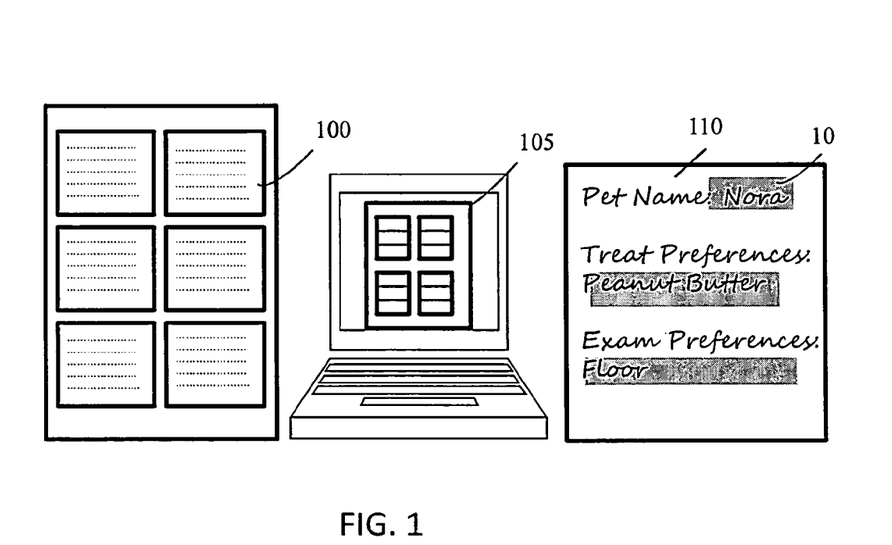
FIG. 1 depicts the various formats of the record.

As shown in FIG. 1, the record(s) can be preprinted labels 100, templates in a word processor 105, or hand written 110.

Figure 2:
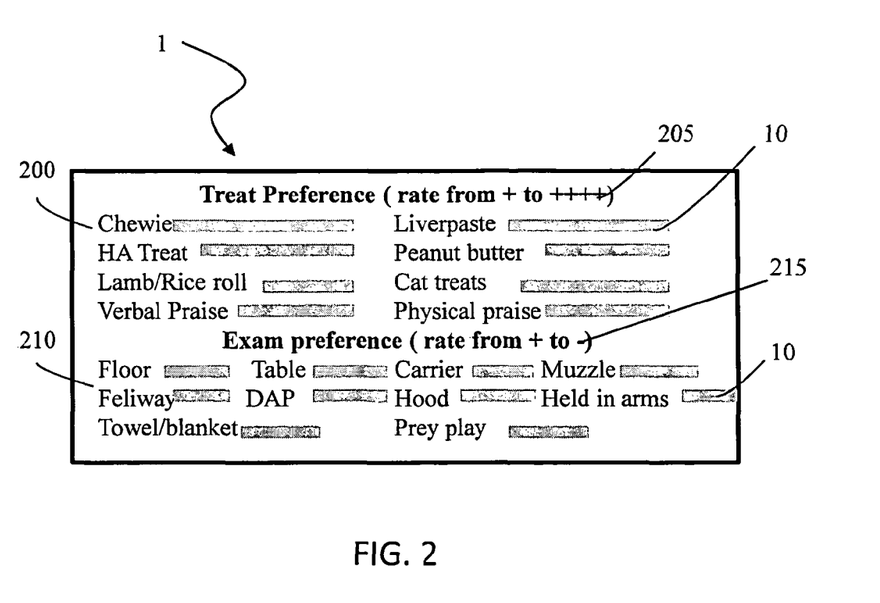
FIG. 2 depicts a record with information about effectiveness of reinforcers on an animal in a particular care situation with scores indicated according to an embodiment of the claimed method and apparatus.
Figure 3:
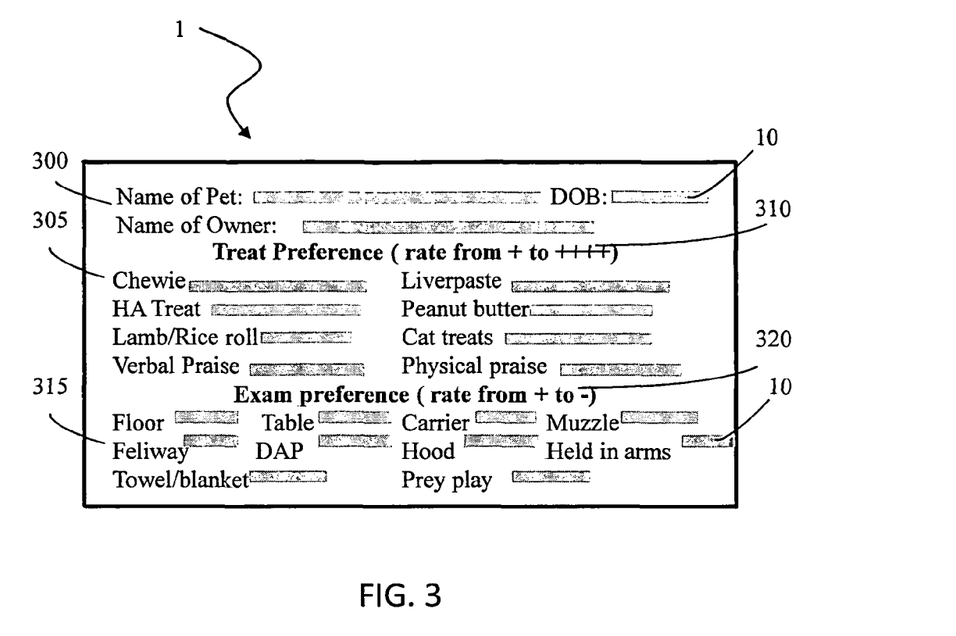
FIG. 3 depicts another record with information about effectiveness of reinforcers on an animal in a particular care situation with scores indicated according to an embodiment of the claimed method and apparatus.

As shown in FIGS. 1-3, the contents of each record 1 includes certain customized fields 10. These fields can be used to record information such as, but not limited to: identification information about the animal, different categories of reinforcers, and fields provided near each reinforcer to describe its effect on the animal.

Reinforcers may include food treats for the animal, including and not limited to: chewy, crunchy, peanut butter, cat treats, liver paste, and lamb/rice rolls. Reinforcers may also include verbal and physical praise and environmental mechanisms, such as treatment location preferences, and tools and aids for examination. Reinforcers in the form of preferred exam locations include, but are not limited to: on a table, on the floor or in the arms of a technician. Reinforcers in the form of tools and aids for examination include, but are not limited to: muzzles, blankets for wrapping or hooding, or the use of Feliway or DAP.

In an embodiment as shown in FIG. 2, the record has a list of reinforcers 200, instructions for scoring 205 each reinforcer or adding comments in its corresponding field 10, a list of exam preferences 210, instructions for scoring 215 each exam preference or adding comments in its corresponding field 10. Records can be reprinted and rescored at any time to reflect changes in the animal's preference over time.

In another embodiment as shown in FIG. 3, the record has a field for recording the information about the animal and owner 300, a list of reinforcers 305, instructions for scoring 310 each reinforcer or adding comments in its corresponding field 10, a list of exam preferences 315, and a field 10 for recording the effect of each examination location on the animal behavior. Records can be reprinted and rescored at any time to reflect changes in the animal's preference over time.

In an embodiment, the effect of a reinforcer is indicated in an additional field using a rating system of plus (+) and/or minus (−) symbols. The animal's positive reaction to a reinforcer is gauged on a scale where (−) indicates no or a negative response to the reinforcer, (+) indicates a moderate positive response, and (++++) indicates the highest level of preference.

In another embodiment, a numeric scale of −5 to +5 is used, in steps of 1. A score of −5 indicates the lowest or highly negative preference, a score of 0 indicates no response, and a 5 indicates the highest positive preference.

In yet another embodiment, a letter grade scale consisting of the scores A, B, C, D and E is used. A score of 'A' indicates the highest positive preference, and a score of 'E' indicates the lowest or negative preference.

If an animal is diagnosed with a food allergy and hence needs to avoid certain foods that were previously used as a reinforcer, information about this allergy or dietary preference as well as new trial treats appropriate for the new diet can be scored and noted on the record.

The record can be used in a variety of care and handling situations, including, but not limited to, grooming, boarding and veterinary care.

Figure 4:
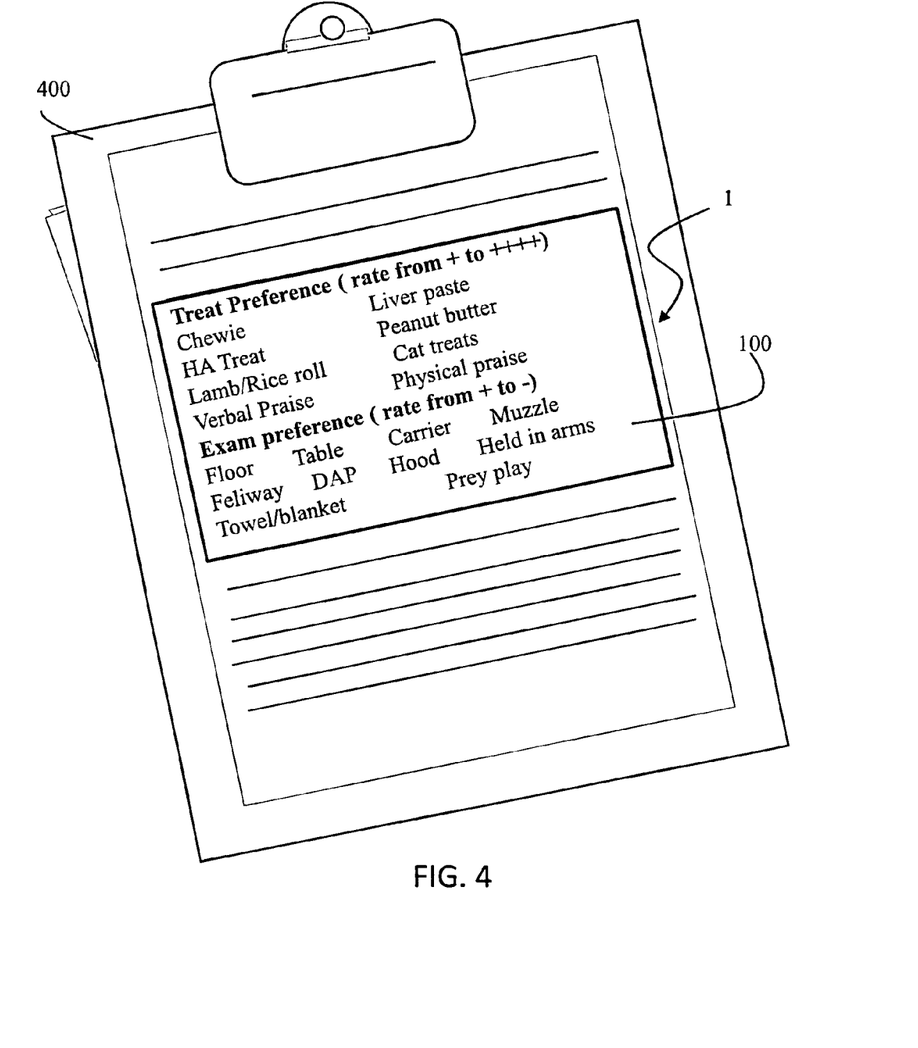
FIG. 4 is representative of how a record can take the form of a label that is affixed to a veterinary chart.

In an embodiment, as shown in FIG. 4, the record 1 is in the form of a preprinted label 100 that can be affixed to, among other things, a veterinary or groomer patient chart 400. The record directs the care takers or handlers to the rewards that work for that animal in that situation. A documentation and scoring system is provided that can be used by any one of a number of care takers or handlers to set up the examination table that is most appealing to the animal, and reward the animal with the reinforcers that score best for care and handling, resulting in a calmer and safer experience for the animal and the handler. If an animal is handled by a different care taker or handler in the same facility, the scored record on the chart will be transferred to the new care taker or handler to help insure a calm animal that behaves safely.

Figure 5:
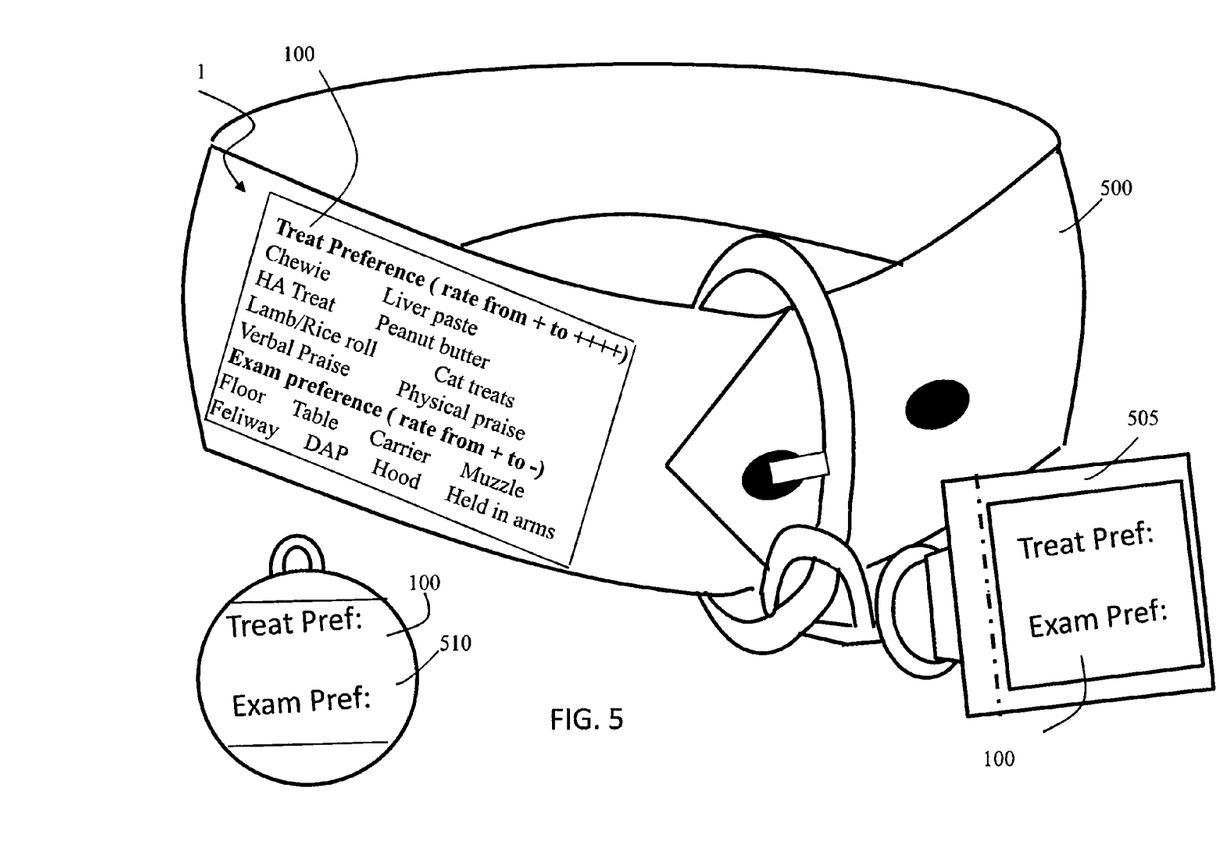
FIG. 5 is representative of how a record can be displayed on a pet collar, leash or tag.

In another embodiment, as shown in FIG. 5, the record 1 is in the form of a preprinted label 100 on the collar 500, leash 505 or tag 510 of the animal.

Figure 6:
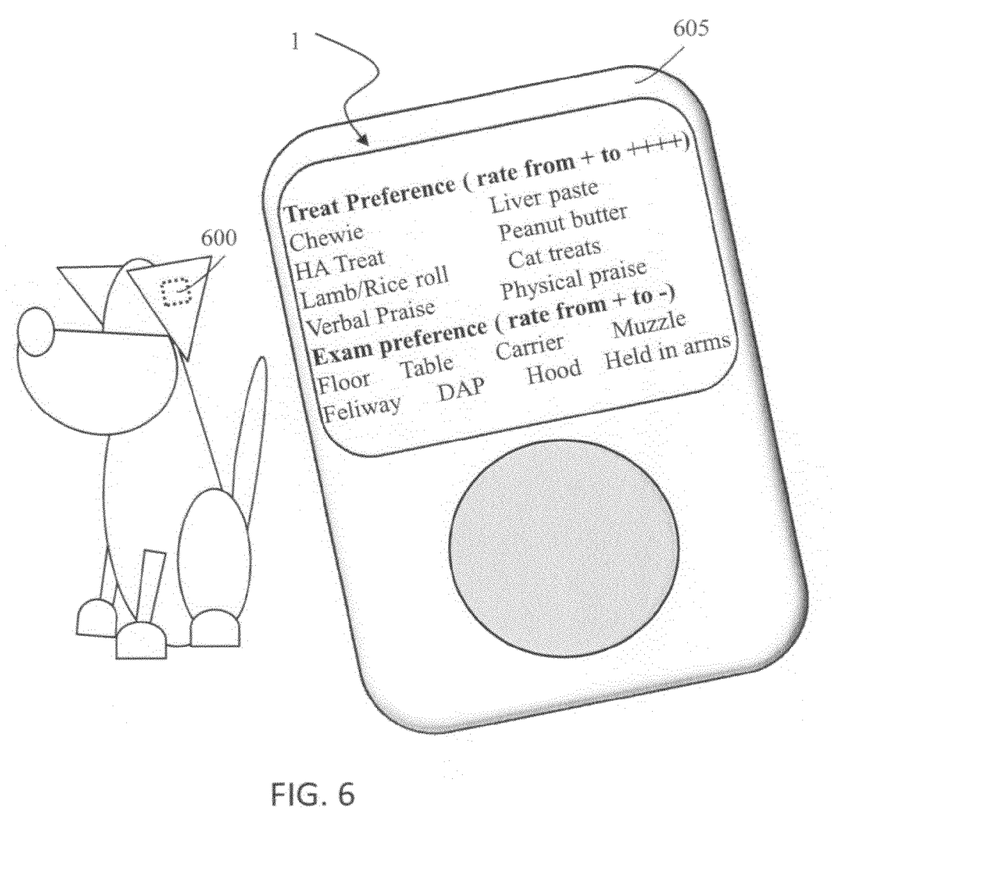
FIG. 6 is representative of how a record can be stored on a computer readable medium that can be scanned by an electronic device to view the contents of the record.

In yet another embodiment, as shown in FIG. 6, the record 1 is stored on a computer readable medium that is, for example, in the form an identification chip 600 placed beneath the skin of the animal or on its collar or identification tag. That computer readable medium can be scanned by an electronic device 605 to reveal the contents of the record.

In still another embodiment, animal owners use their own records with appropriate reinforcer information to have a less stressful and reactive animal at home in various situations such as loading a cat in a carrier or treating a wound. In an embodiment, scoring the animal's preferences in a care situation is performed by the owner or handler prior to taking the animal to the care facility. If the owner is aware of the preferences of his or her own animal, he or she keeps track of this information on tags for personal use, and bring their animal's preferred reinforcers to the care facility for use during the care or handling of the animal. These personal-use records can be scored and modified according to the customized preferences of the animal that may change over time. So, a pet owner can determine that liver sausage is, for example, a 4 plus or (++++) score for their pet, and bring this along at a veterinary appointment to use as the pet waits in the waiting room or for exam.

Documentation and scoring the effectiveness of reinforcers provides a more consistent experience for an individual animal. For a system to be effective, it also needs to be universal in use—a standardized method that enables rapid understanding of what reinforcers work best for each animal in a given situation. Therefore a method of documenting which reinforcers are most appealing to an animal enables all handlers in a given care facility to provide the least stressful and most positive experience possible for the animal.

In an embodiment, records can be changed and modified if the animal's preferences change for any reason. This ensures that the information is tracked and consistently associated with the same animal regardless of the identity of the handler in a given care facility. This also makes the care of the animal easier to deliver, and less likely for handlers to be injured.

In another embodiment, changes to the scoring of known reinforcers are used as an indicator of prior existing pain or stress, thereby assisting the handler's diagnosis or approach toward the animal. When an animal is in pain, or affected by stimuli that cause fear or anxiety, they might not accept their known reinforcers. When the animal does not accept the known reinforcer, the animal's behavior will raise concern with the handler or the owner. A calm and pain-free animal would not typically refuse the reinforcer. This will prompt questioning, and should result in a more in-depth physical exam or a more careful approach to the animal, and signal that the animal is in need of veterinary care. By knowing the rank of the reinforcer, we can gain information about an animal's physical and mental state and use this information in evaluating the animal. Medical problems may be caught earlier, resulting in better animal care. Without the score and documentation of effective reinforcers on the tag, it would be more difficult to evaluate the pain or stress level in the animal. Valuable information about the animal's health state can be revealed by using the tag and scoring system.

SPECIFIC EXAMPLES

The following examples are meant only to illustrate, but in no way limit, the claimed invention.

Specific Example 1

Bella's Nail Trim

Figure 7:
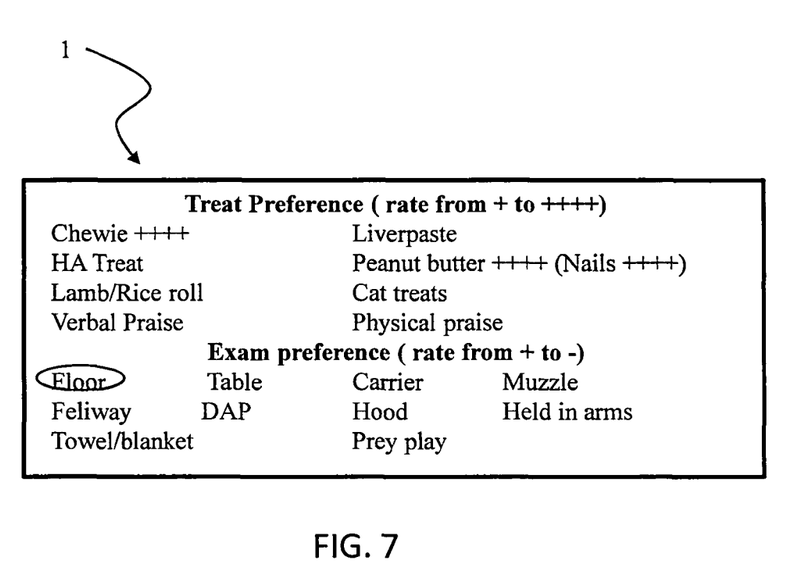
FIG. 7 is representative of a record according to an embodiment.

Bella is a dog. Bella's owner brought her to the veterinarian for her first nail trim. Bella's owner warned that she does not like to have her nails trimmed, and that she is often hard to handle during the procedure. Bella had not been conditioned previously with rewards for coming to the veterinarian. Bella did not have any underlying food problems or allergies. The staff began by offering small bits of chewy meat-flavored treats, which Bella really liked. The staff therefore decided to calm Bella with the highly motivating meat-flavored chewy treat to be the most "happy" for her nail trim. As Bella was put on the exam table, she continued to receive treats. While on the table, Bella was placated by the treats. She took them directly from the staffs' hands and from the table. While she was receiving the treats, Bella exhibited positive and non-aggressive body language. As a result, Bella scored a 4 plus (++++) on her tag for chewy treats, and now had a positive association with the exam table, the staff and the nail clippers. When the staff began to clip Bella's nails, she stopped taking treats from the exam table and her body became tense. As a result, the staff was able to note that Bella was stressed and that her increased anxiety overrode her desire for the reward. The staff therefore determined that they needed to find a more rewarding treat for Bella. If the staff continued to struggle with Bella once she became stressed, she would associate the struggle and anxiety with the nail trimming experience. The staff therefore attempted to gauge Bella's reaction to peanut butter served to her on a tongue depressor. Bella immediately relaxed and was more motivated to eat the peanut butter than to notice the nail trimming procedure. After the procedure, Bella was lowered onto the floor and given more chewy treats. Her tag was then scored as seen in FIG. 7.

Specific Example 2

Bailey's Geriatric Exam

Figure 8:
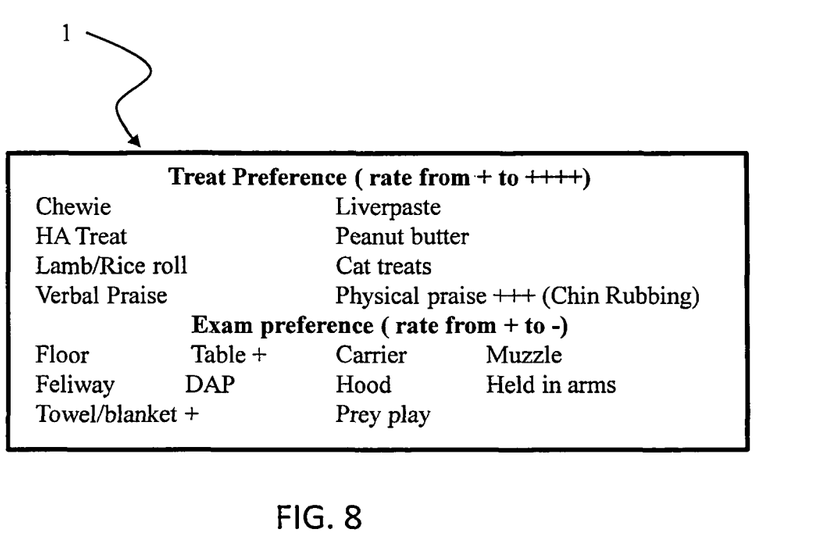
FIG. 8 is representative of a record according to another embodiment.

Bailey is a cat. Her owner came to the office for an examination because Bailey had been urinating out of his litter box, was suffering from a decreased appetite and was less social at home. Bailey would not take any treats and was more relaxed the less she felt that she was being restrained. A staff member used a towel and her arms to hide Bailey's head to help her relax. Bailey's ears were forward and her body was not tense, indicating that she was accepting of this handling. After an examination of Bailey, the staff needed to take blood and urine tests. Bailey's head and her front paws were gently held without scruffing, and her chin was rubbed to distract and reward. A second staff member found the appropriate vein to take the blood sample from Bailey's hind leg, and held the other leg out of the way to prevent injury. Bailey was not exhibiting signs of stress or tension, but was rather purring throughout this portion of the procedure. Bailey's tag was then scored as seen in FIG. 8.

| SUMMARY OF ITEMS SHOWN IN THE DRAWINGS | | |
|---|---|---|
| ITEM # | DESCRIPTION | FIG. # |
| 1 | RECORD | 2, 3, 4, 5, 6, 7, 8 |
| 10 | FIELD | 1, 2, 3 |
| 100 | PREPRINTED LABELS | 1, 4, 5 |
| 105 | TEMPLATES IN A WORD PROCESSOR | 1 |
| 110 | HAND WRITTEN RECORDS | 1 |
| 200 | LIST OF REINFORCERS | 2 |
| 205 | INSTRUCTIONS FOR SCORING | 2 |
| 210 | LIST OF EXAM PREFERENCES | 2 |
| 215 | INSTRUCTIONS FOR SCORING | 2 |
| 300 | FIELD FOR RECORDING INFORMATION ABOUT ANIMAL AND OWNER | 3 |
| 305 | LIST OF REINFORCERS | 3 |
| 310 | INSTRUCTIONS FOR SCORING | 3 |
| 315 | LIST OF EXAM PREFERENCES | 3 |
| 400 | VETERINARY OR GROOMER PATIENT CHART | 4 |
| 500 | COLLAR | 5 |
| 505 | LEASH | 5 |
| 510 | TAG | 5 |
| 600 | IDENTIFICATION CHIP | 6 |
| 605 | ELECTRONIC DEVICE | |

Conclusion, Ramifications, and Scope of Invention

Thus the reader will see that the method for animal care enables safety for both animals and animal handlers in animal care situations.

While the above description contains many specificities, these should not be construed as limitations on the scope of the invention, but rather as exemplifications of embodiments thereof. Many other variations are possible. For example, the record can be printed on water-proof plastic tag or a permanent tag. The record may be stored electronically, on a cell phone or laptop or desktop computer or a mobile computing device. The record may have preprinted information or may be hand-written. The record may be in the form of a standard electronic document or a document template. The record may be an adhesive tag that can be affixed to a document or animal tag or animal collar. A numerical, alphabetical, alphanumeric, or symbolic system of scoring preferences for treats and examination preferences may be used.

Accordingly, the scope of the invention should be determined not by the embodiment(s) illustrated, but by the appended claims and their legal equivalents.

Sequence Listing

Not applicable

The invention claimed is:

1. A method of documenting animal behavioral responses, the method comprising:
    associating an animal with a record, wherein the record identifies a reinforcer and includes a rating field associated with the reinforcer;
    observing behavior of the animal at a first instance, wherein the observed behavior exhibits a first anxiety level;
    administering the identified reinforcer to the animal;
    observing behavior of the animal at a second instance in reaction to administering the reinforcer to the animal, wherein the observed behavior exhibits a second anxiety level;
    assigning a rating to the administered reinforcer correlating to the extent of the difference between the first anxiety level and the second anxiety level; and
    recording the assigned rating in the rating field associated with the identified reinforcer.

2. The method of claim 1, wherein the first instance and the second instance occur before performing a physical handling procedure on the animal, and the identified reinforcer is administered to the animal before performing the physical handling procedure on the animal.

3. The method of claim 1, wherein the first instance and the second instance occur while performing a physical handling procedure on the animal, and the identified reinforcer is administered to the animal while performing the physical handling procedure on the animal.

4. The method of claim 1, wherein the identified reinforcer is a food item.

5. The method of claim 1, wherein the identified reinforcer is a praising action.

6. The method of claim 1, wherein the identified reinforcer is an examination location.

7. The method of claim 1, wherein the identified reinforcer is an examination aid.

8. The method of claim 1, wherein the identified reinforcer is a synthetic pheromone.

9. An animal handling method, comprising:
    reviewing a record associated with an animal, wherein the record identifies at least one rated reinforcer and, for each rated reinforcer of the at least one rated reinforcer, the record includes a rating associated with the rated reinforcer describing the extent of a change in anxiety exhibited by the animal in reaction to the administration of the rated reinforcer to the animal;
    deciding whether to administer a rated reinforcer to the animal based on the rating associated with the rated reinforcer; and
    if deciding to administer the rated reinforcer to the animal, administering the rated reinforcer to the animal.

10. The method of claim 9, further comprising performing a physical handling procedure on the animal, wherein the rated reinforcer is administered before performing the physical handling procedure on the animal.

11. The method of claim 9, further comprising performing a physical handling procedure on the animal, wherein the rated reinforcer is administered while performing the physical handling procedure on the animal.

12. The method of claim 9, wherein the record identifies a plurality of rated reinforcers;
    wherein deciding whether to administer a rated reinforcer to the animal is based on comparing each rating associated with each rated reinforcer of the plurality of rated reinforcers.

13. The method of claim 9, further comprising:
    observing behavior of the animal at a first instance prior to administering the rated enforcer to the animal, wherein the observed behavior exhibits a first anxiety level; and
    observing behavior of the animal at a second instance after administering the rated enforcer to the animal, wherein the observed behavior exhibits a second anxiety level.

14. The method of claim 13, further comprising changing the rating of the administered reinforcer in the record based to a new rating correlating to the extent of the difference between the first anxiety level and second anxiety level.

15. The method of claim 13, further comprising:
    deciding whether to administer another rated enforcer to the animal based on the extent of the difference between the first anxiety level and the second anxiety level; and
    if deciding to administer the another rated reinforcer to the animal, administering the another rated reinforcer to the animal.

* * * * *